Oct. 15, 1963  F. S. FLICK  3,106,939
ACTUATOR VALVE STRUCTURE
Filed May 19, 1960  2 Sheets-Sheet 1
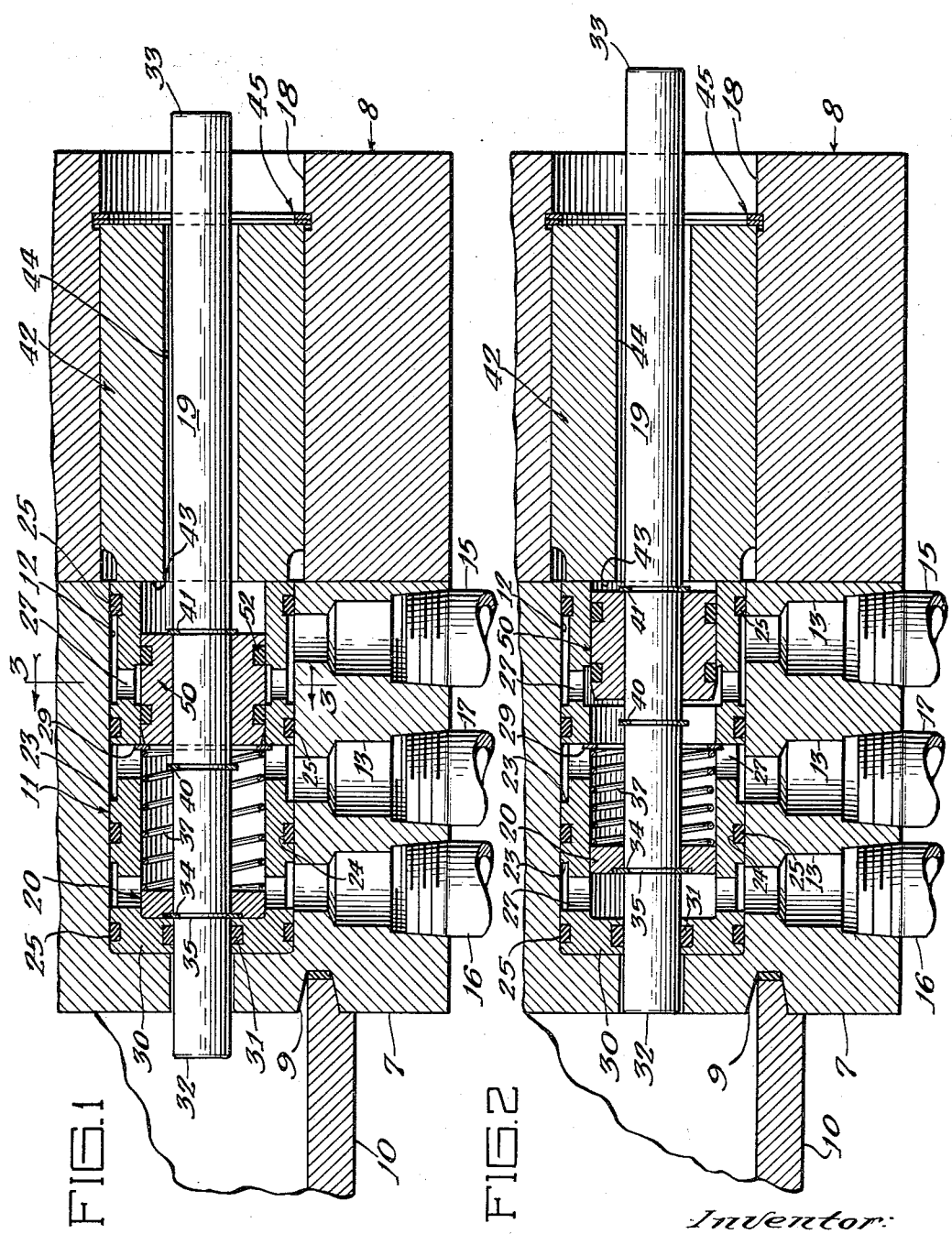
Inventor:
Francis S. Flick
By: Hofgren, Brady, Wegner,
Allen & Stellman
Attorneys Oct. 15, 1963  F. S. FLICK  3,106,939
ACTUATOR VALVE STRUCTURE
Filed May 19, 1960  2 Sheets-Sheet 2

Inventor:
Francis S. Flick
By: Hofgren, Brady, Wegner,
Allen & Stellman
Attorneys United States Patent Office
3,106,939
Patented Oct. 15, 1963

3,106,939
ACTUATOR VALVE STRUCTURE
Francis S. Flick, Oak Park, Ill., assignor to Flick-Reedy Corporation, a corporation of Illinois
Filed May 19, 1960, Ser. No. 30,335
7 Claims. (Cl. 137—625.69)

This invention relates to an actuator structure used for controlling sequence operations of apparatus and more particularly to a novel actuator structure which may be placed as a unit into a housing such as a bore in a cylinder head or the like.

Heretofore, actuators employed in the control of fluid apparatus have necessitated time consuming assemblage of individual valve components within a housing adapted for containing them. Applicant has provided an actuator structure which may be inserted into a housing bore as a single unit requiring no fastening of fluid connections or alignment of adjacent parts. The structure has the further distinct advantage of being composed of very economical and elementary parts requiring only simple machining and forming operations in their manufacture.

It is therefore a principal object of this invention to provide a new and improved actuator structure for use in controlling fluid apparatus.

Another object of the present invention is to provide an actuator structure which may be inserted and removed as a single unit from a valve housing by manipulation of an exposed end of the actuator rod.

A further object is to provide an economical actuator structure which is composed of elementary and simply formed parts.

Other objects, features and advantages of the present invention will be apparent from the following description of the preferred embodiment illustrated in the accompanying drawings, in which:

FIGURE 1 is a fragmentary sectional view of the head of a cylinder showing an actuator valve mounted therein embodying the present invention and in a first extreme position;

FIGURE 2 is a fragmentary sectional view similar to FIGURE 1 showing the actuator in another extreme position;

Figure 3:
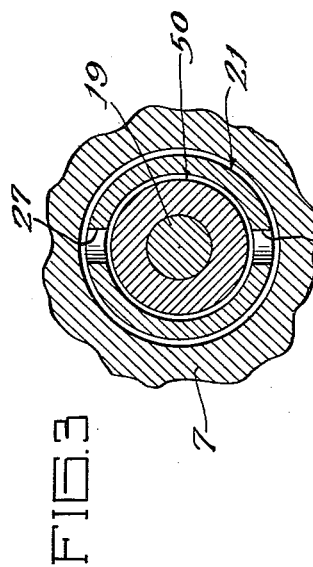
FIGURE 3 is a fragmentary sectional view through the actuator valve taken substantially along line 3—3 of FIGURE 1.
Figure 5:
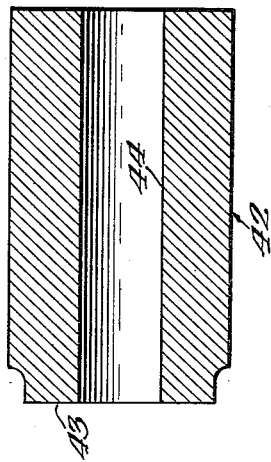
FIGURE 5 is a central sectional view of the actuator retaining member shown in FIGURES 1 and 2.

The preferred embodiment of the present invention is shown used in connection with a piston and cylinder device wherein the actuator valve is a part of a fluid operated control circuit controlling the flow of motive fluid to the piston and cylinder device. For example, the piston and cylinder device may be part of an air operated booster mechanism for supplying hydraulic fluid at high pressures to operate a cylinder.

Referring more particularly to FIGURES 1 and 2, the piston and cylinder device in which the actuator is shown has a head 7 of an air cylinder joined side by side to a head 8 of a hydraulic booster cylinder. The head 7 has an annular groove 9 on its internal face to receive the end of an air cylinder barrel 10 which is sealed therein by the use of flexible sealing material.

An actuator valve structure, generally designated 11, is mounted within a circular cylindrical stepped bore 12 extending laterally through the head 7 of the air cylinder, hereinafter called the housing. Fluid lines are connected to the bore at longitudinally spaced locations by smaller stepped bores 13 leading from the outer surface of the head 7 laterally into the housing bore. Each smaller bore 13 has a threaded mouth to receive one of the fluid conduits here shown three in number and including a supply fluid line 15, an exhaust fluid line 16, and a control fluid line 17.

The valve structure is inserted into the housing bore by access through an aligned bore 18 in the head 8 of the hydraulic cylinder, the bore 18 being slightly larger in diameter than the housing bore 12.

The present invention provides an actuator valve structure which may be easily inserted and removed from a housing as a single unit requiring no connections or alignments of valve components therein. For purposes of illustration, a spool-type valve structure is utilized in the construction of the preferred embodiment. Referring to FIGURES 1 and 2, the unitary actuator valve structure broadly comprises an assemblage of an actuator rod 19, a pair of spool valve members 20 and 50 thereon, and a surrounding valve sleeve 21.

The valve sleeve 21 is a one-piece, cup shaped member adapted to substantially fill the larger portion of the housing bore 12. The sleeve has a relatively smooth circular cylindrical outer surface 22 having a plurality of spaced annular grooves 23 each located for alignment with one of the fluid lines leading into the housing bore upon insertion therein. The grooves 23 are separated from each other when the valve sleeve is inserted into the bore 12 by means of a plurality of O-rings 25 received in grooves 24 provided for that purpose in the valve sleeve. The O-rings engage the surface of bore 12 and the valve sleeve so that the fluid lines 13 are sealed from mutual communication on the outside of the valve sleeve. The valve sleeve is provided with radially directed ports 27 connecting the interior of the valve sleeve with each of said grooves 23 to provide fluid connection of the interior of the sleeve with said fluid lines.

The actuator rod 19 is of a length to extend through the sleeve member 21 and out both ends thereof. The inner end 32 of the rod extends through a bottom wall 30 of the valve sleeve and an O-ring 31 therein, through the smaller stepped portion of the housing bore, and into the interior of the air cylinder where it may be physically contacted by the piston of the piston and cylinder device and moved to the right in the figures of the drawings. The opposite end 33 of the rod extends out of the housing bore 12 and sleeve 21, through the aligned bore 18 to be exposed for manual manipulation. In certain actuators, the outer end of the rod may be used to operate electric switch controls or the like.

Figure 4:
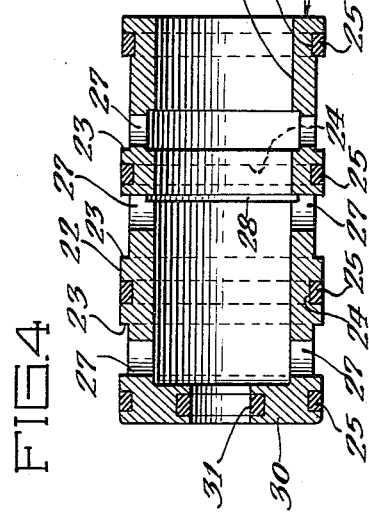
FIGURE 4 is a central sectional view of the one-piece actuator valve housing of the actuator showing in FIGURES 1-3.
Figure 6:
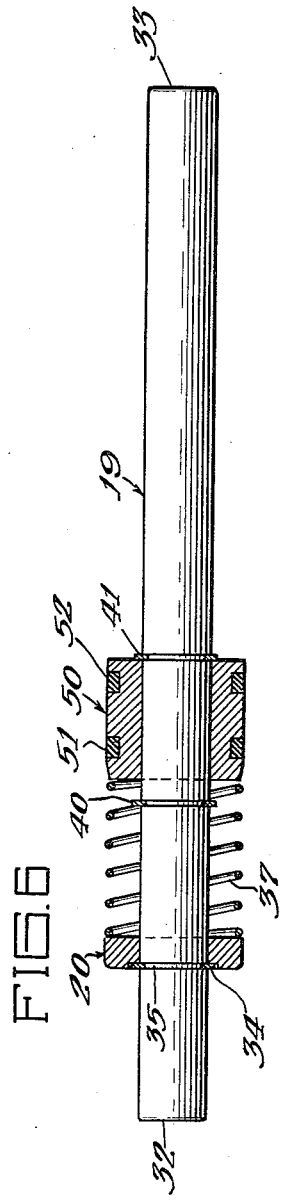
FIGURE 6 is a fragmentary central sectional view of the actuator rod with valve means mounted thereon shown detached from said actuator valve housing of FIGURE 4.

The assembly of the actuator rod in the sleeve member may best be understood by referring first to the parts as disassembled in FIGURES 4 and 6 and then to the assembly of FIGURES 1 and 2. The actuator rod 19 has a forward spool 20 which is urged against the snap ring 34 mounted in a groove 35 near the inner end of the rod. The spool 20 is intended to have a close but not tight fit with the interior of the sleeve member 21. Another spool 50 is intended to slide on the actuator rod between two split ring abutments 40 and 41 which limit its movement. The outer surface of the spool 50 is sealed to the inner surface of the sleeve by a pair of spaced O-rings 51 and 52. A helical coil spring 37 bears against the forward spool 20 and the sleeve member to hold the assembly together. The rearward end of the spring 37 in the assembly will bear upon a split ring 29 inserted in the groove 28 in the sleeve. This relationship is shown in FIGURES 1 and 2.

When the assembly is accomplished, the entire actuator valve may be inserted into the bore 12 of the housing by manipulation of the outer exposed end of the rod. Referring to FIGURE 2, the assembly could be removed when the spacer 42 is removed from the outer bore 18 following removal of a split ring retainer 45. A pull to the right in the figures of the actuator rod would tend to collapse the coil spring 37 until the coils were against each other at which point continued pull would slide the sleeve out of the bore 12. Upon insertion or a desire to insert the assembly into the bore 12, a push to the left on the rod 19 will bring the ring 41 against the right-hand side of the spool 50 which in turn will abut the split ring 29 secured to the sleeve, thereby moving the entire assembly into the bore 12.

Once the assembled actuator is in place in the fluid power apparatus, it will automatically control connection between the fluid lines substantially in the manner disclosed in U.S. Letters Patent No. 2,888,951, issued June 2, 1959 to the assignee of this application. Generally, the valve is so constructed that initial movement of the rod by a piston member in the air cylinder will first shut off communication to the exhaust and then will snap open to connect the air supply line with the control line. In normal operation the inner end 32 of the actuator rod 19 is physically contacted by the piston of the piston and cylinder device and moves the inner end slowly into the housing as shown in FIGURES 1 and 2. This movement starts to take up lost motion and also moves forward spool 20 past exhaust line 16 to substantially close the exhaust line from the actuator. Continued movement of the actuator rod 19 opens supply line 15, as spool 50 moves to the right, and control line 17 as shown in FIGURE 2. The instant the supply line is opened to any extent, the spool 50 snaps to the right opening the supply line fully. In viewing FIGURES 1 and 2, showing opposite extreme positions of the actuator, it will be noted that the outer exposed end of the rod is at all times exposed so as to give a visual indication of position as well as to provide a means for connection of other controls, if desired.

The foregoing detailed description has been given for clearness of understanding only, and no unnecessary limitations are to be understood therefrom, for some modifications will be obvious to those skilled in the art.

I claim:

1. An actuator valve structure for placement in the head of a piston and cylinder device wherein the head is provided with a cylindrical bore and spaced fluid passages connected thereto, comprising: an assembly including a one-piece sleeve and an actuator valve rod having valve spool members mounted thereon and slidable in said sleeve, said sleeve having an inner surface engaged by said valve spool members, means within said sleeve for mounting said sleeve upon said rod and valve spool members in said assembly permitting limited movement of the latter relative to said sleeve, said mounting means holding said sleeve, spool members and rod together for concurrent movement selectively into and from said cylinder bore, said sleeve having a smooth cylindrical outer surface for assembly into the bore in said cylinder head and carrying sealing members for engaging said bore, said sealing members being spaced to separate said spaced fluid passages from each other, means in said sleeve for conducting fluid individually from each of said passages to the interior of the sleeve, and removable means for securing said sleeve in the bore in said head whereby the entire valve assembly may be inserted into the head of the cylinder device by manipulation of said actuator valve rod.

2. An actuator valve structure as specified in claim 1 wherein said mounting means includes coiled spring means engaging said one-piece sleeve and one valve spool member urging said rod and said spool member in one direction and limiting relative movement of the rod and spool member in the opposite direction when said coil spring is compressed.

3. An actuator valve structure as specified in claim 1 wherein said mounting means includes a snap ring on the interior of said one-piece sleeve and means on said rod and valve spool members for engaging said snap ring to maintain said sleeve member, valve spools and rod in assembly.

4. An actuator valve structure for placement in a valve housing provided with a cylindrical bore and spaced fluid passages, comprising: an assembly including an actuator valve rod having valve spool members mounted thereon and a surrounding one-piece sleeve, said sleeve having a circular cylindrical outer surface adapted for close assembly into said housing bore and having a plurality of spaced annular grooves each located for alignment with one of said fluid passages, sealing means on said sleeve for engaging said bore to separate said spaced annular grooves, said sleeve having a circular cylindrical inner surface sealingly engaged by at least one valve spool member and a plurality of passages connecting said spaced annular grooves with the interior of the sleeve, said sleeve carrying a sealing member for engaging the rod; a helical spring about said rod urging the rod in one direction relative to said sleeve and limiting movement of said rod in the opposite direction relative to said sleeve; and means within said sleeve for holding said sleeve, spool members and rod together for concurrent movement so that the assembly may be inserted and removed from the housing bore as a unit by manipulation of one end of said rod.

5. An actuator valve structure for assembly as a unit into a housing having a cylindrical bore with fluid passages spaced longitudinally of the bore and extending laterally thereinto, comprising: a one-piece circular cylindrical sleeve member having a smooth outer surface for close assembly into said bore, said outer sleeve surface having a plurality of annular grooves, each groove being aligned with one of said fluid passages, said sleeve having fluid ports each extending radially into one of said aligned grooves; sealing members carried by said sleeve member for sealing engagement with said housing bore; an actuator rod extending through said sleeve and out of both ends, one end of the rod being positioned for receiving a motive force to move the rod longitudinally and the opposite end extending out of the housing; valve spools operatively connected on said rod and in sliding engagement with the inner surface of said sleeve for controlling fluid flow through said fluid passages upon movement of said actuator rod; resilient means bearing between said sleeve and actuator rod to limit reciprocal movement of said rod and spool member relative to said sleeve; and means within said sleeve for holding said sleeve, sealing members, rod and spools to maintain said assembly so that the assembly may be selectively inserted and removed from the housing bore as a unit by manipulation of said opposite end of the rod.

6. An actuator valve for control of fluid apparatus, comprising: a housing for the valve including a smooth cylindrical bore having spaced fluid lines communicating with the bore for separately conducting supply, control, and exhaust fluid to and from the bore; a sleeve member in the bore carrying means for sealing with the bore in longitudinally spaced positions, said sleeve having outer grooves each aligned with their respective fluid lines and having ports connecting each groove with the interior of the sleeve; an actuator rod extending through the sleeve and out of said bore; valve spool members mounted on the rod for selective control of communications between said ports; and means within said sleeve limiting movement of said rod and valve spool members relative to said sleeve member so that the assembly of sleeve member, rod and spool members may be selectively inserted and removed from the bore as a unit.

7. In a piston and cylinder device, an actuator valve, comprising in combination: a valve housing including a bore in a head on the piston and cylinder device extending therethrough; means providing a control fluid line, a supply fluid line and an exhaust fluid line connected to said bore in spaced relation longitudinally of the bore; a hollow cylindrical one-piece body substantially filling said bore and having a plurality of spaced annular outer grooves each aligned with a separate one of said fluid lines; sealing means between said grooves separting said fluid passages and grooves, said body having fluid ports extending radially between the interior thereof and each of said grooves; an actuator rod within the valve having one end extending through said bore into the interior of the piston and cylinder device for receiving contact by the piston, the opposite end of said rod extending out of the head of the cylinder device; valve spool members mounted on the rod for controlling communication between said fluid lines; and retaining means within said sleeve including resilient means in engagement with one of said valve spool members and said sleeve to limit movement of said rod and valve spool members relative to said sleeve members so that the assembly of the sleeve member, rod and spool members may be selectively inserted and removed from the bore as a unit.

References Cited in the file of this patent
UNITED STATES PATENTS

| | | |
|---|---|---|
| 2,370,076 | Rosenberger | Feb. 20, 1945 |
| 2,396,643 | Ganahl et al. | Mar. 19, 1946 |
| 2,583,049 | Hartemann | Jan. 22, 1952 |
| 2,630,135 | Johnson | Mar. 3, 1953 |
| 2,796,081 | Dannevig et al. | June 18, 1957 |
| 2,822,818 | Braznick | Feb. 11, 1958 |
| 2,920,650 | Moog | Jan. 12, 1960 |
| 2,929,362 | Hayner | Mar. 22, 1960 |
| 2,930,578 | Piros | Mar. 29, 1960 |
| 3,012,582 | Russell | Dec. 12, 1961 |